United States Patent
Chi et al.

(10) Patent No.: US 9,738,819 B2
(45) Date of Patent: Aug. 22, 2017

(54) PRESSURE-SENSITIVE ADHESIVE COMPOSITION

(71) Applicant: LG Chem, Ltd., Seoul (KR)

(72) Inventors: Han Na Chi, Daejeon (KR); No Ma Kim, Daejeon (KR); Jeong Ae Yoon, Daejeon (KR); Sung Soo Yoon, Daejeon (KR); Min Ki Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/563,193

(22) Filed: Dec. 8, 2014

(65) Prior Publication Data

US 2015/0086781 A1    Mar. 26, 2015

Related U.S. Application Data

(63) Continuation of application No. PCT/KR2014/005447, filed on Jun. 19, 2014.

(30) Foreign Application Priority Data

Jun. 19, 2013 (KR) ........................ 10-2013-0070539

(51) Int. Cl.
| | |
|---|---|
| B32B 7/12 | (2006.01) |
| C09J 153/00 | (2006.01) |
| C08K 5/105 | (2006.01) |
| C09J 11/06 | (2006.01) |
| G02B 1/04 | (2006.01) |
| C09J 133/06 | (2006.01) |
| C08F 293/00 | (2006.01) |
| G02B 5/30 | (2006.01) |

(52) U.S. Cl.
CPC ......... *C09J 153/00* (2013.01); *C08F 293/005* (2013.01); *C08K 5/105* (2013.01); *C09J 11/06* (2013.01); *C09J 133/066* (2013.01); *G02B 1/04* (2013.01); *G02B 5/305* (2013.01); *C09J 2201/606* (2013.01); *G02B 5/3033* (2013.01); *G02F 2202/28* (2013.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,230,768 A * | 10/1980 | Hamada ................. B32B 27/08 359/487.02 |
| 6,197,883 B1 | 3/2001 | Schimmel et al. | |
| 7,285,313 B2 | 10/2007 | Kim et al. | |
| 7,714,052 B2 * | 5/2010 | Paul et al. ..................... 524/376 |
| 2003/0119970 A1 | 6/2003 | Husemann et al. | |
| 2004/0097658 A1 * | 5/2004 | Everaerts ............ C08F 293/005 525/244 |
| 2005/0090592 A1 | 4/2005 | Husemann et al. | |
| 2005/0181148 A1 | 8/2005 | Kim et al. | |
| 2006/0024521 A1 * | 2/2006 | Everaerts et al. ............ 428/522 |
| 2007/0055006 A1 * | 3/2007 | Kim et al. ..................... 524/556 |
| 2009/0275705 A1 * | 11/2009 | Fujita et al. .................. 525/342 |
| 2009/0305068 A1 | 12/2009 | Morishita et al. | |
| 2009/0306256 A1 | 12/2009 | Mader et al. | |
| 2011/0033720 A1 | 2/2011 | Fujita et al. | |
| 2011/0205469 A1 | 8/2011 | Ha et al. | |
| 2011/0319549 A1 | 12/2011 | Oda et al. | |
| 2013/0079468 A1 | 3/2013 | Kanemura et al. | |
| 2014/0242303 A1 * | 8/2014 | Lee ...................... G02B 5/3025 428/1.55 |
| 2015/0093569 A1 * | 4/2015 | Chi et al. ...................... 428/354 |
| 2015/0291859 A1 | 10/2015 | Takamura et al. | |
| 2016/0145470 A1 * | 5/2016 | Lee ........................ C09J 175/04 428/1.55 |
| 2016/0145475 A1 * | 5/2016 | Lee ........................ C09J 7/0239 428/1.31 |

FOREIGN PATENT DOCUMENTS

| | | |
|---|---|---|
| CN | 1764679 A | 4/2006 |
| CN | 101548204 A | 9/2009 |
| CN | 102482550 A | 5/2012 |
| EP | 2857472 A1 | 4/2015 |
| EP | 3012305 A1 | 4/2016 |
| JP | 07-082542 | 3/1995 |
| JP | 2000034387 A | 2/2000 |

(Continued)

OTHER PUBLICATIONS

Definition of "Photostabilizer", Compendium of Polymer Terminology and Nomenclature IUPAC Recommendations 2008, 2008.*
Technical information "Tinuvin 765", BASF The Chemical Company, Jul. 2011.*
Donatas, Satas (ed), "Handbook of Pressure Sensitive Adhesive Technology", 1999, Satas & Associates, 3rd edition, pp. 458-459.*
Office Action from corresponding Taiwanese Application No. 103121229, dated Jun. 10, 2015.
International Search Report and Written Opinion for Application No. PCT/KR2014/005447 dated Sep. 24, 2014.
Office Action from Chinese Application No. 201480003101.2, dated Jan. 13, 2016.
Extended Search Report from European Application No. 14814215. 1, dated Nov. 23, 2016.

*Primary Examiner* — Anish Desai
(74) *Attorney, Agent, or Firm* — Lerner, David, Littenberg, Krumholz & Mentlik, LLP

(57) ABSTRACT

Provided are a pressure-sensitive adhesive composition, an optical member, a polarizing plate and a display device. The pressure-sensitive adhesive composition having physical properties required for an optical member using a particular block copolymer and an antioxidant or a photostabilizer, which forms a fine phase change region in a crosslinking structure, and particularly having excellent bending preventability and storage stability may be provided. Such a pressure-sensitive adhesive composition may be used for optical uses, for example, to laminate various optical members, or apply an optical member to a display device.

9 Claims, No Drawings

(56) References Cited

FOREIGN PATENT DOCUMENTS

| | | |
|---|---|---|
| JP | 2003183614 A | 7/2003 |
| JP | 2004505166 A | 2/2004 |
| JP | 2006282687 A | 10/2006 |
| JP | 2008542487 A | 11/2008 |
| JP | 2013035879 A | 2/2013 |
| JP | 2015525261 A | 9/2015 |
| KR | 20020010693 | 2/2002 |
| KR | 20050076706 A | 7/2005 |
| KR | 20090077652 A | 7/2009 |
| KR | 20110002857 A | 1/2011 |
| TW | 201132722 A | 10/2011 |
| WO | 2010113883 A1 | 10/2010 |
| WO | 2011027707 A1 | 3/2011 |
| WO | 2011152514 A1 | 12/2011 |
| WO | WO 2011152514 A1 * 12/2011 | ............ C09J 153/00 |
| WO | 2012129362 A2 | 9/2012 |
| WO | 2013180524 A1 | 12/2013 |
| WO | 2014069356 A1 | 5/2014 |

* cited by examiner

“glass transition temperature of a predetermined block” of the block copolymer used herein is a value calculated according to types and ratios of monomers included in the block. In one example, the glass transition temperature of the first block may be 60, 65, 70 or 75° C. or more. In addition, the upper limit of the glass transition temperature of the first block may be, but is not particularly limited to, for example, approximately 95 or 90° C. In addition, the glass transition temperature of the second block may be −35, −40 or −45° C. or less. In addition, the lower limit of the glass transition temperature of the second block may be, but is not particularly limited to, for example, approximately −80, −70, −60 or −55° C. In the block copolymer, a difference (A−B) of the glass transition temperature (A) of the first block and the glass transition temperature (B) of the second block may be, but is not particularly limited to, for example, approximately 80 to 150° C.

PRESSURE-SENSITIVE ADHESIVE COMPOSITION

CROSS-REFERENCE TO RELATED APPLICATIONS

The present application is a continuation of International Application No. PCT/KR2014/005447, filed on Jun. 19, 2014, which claims priority to and the benefit of Korean Patent Application No. 2013-0070539, filed on Jun. 19, 2013, the disclosures of which are incorporated herein by reference.

1. Field of the Invention

The present invention relates to a pressure-sensitive adhesive composition, an optical member, a polarizing plate, and a display device.

2. Discussion of Related Art

Various optical members such as a polarizing plate, a retardation plate or a brightness-enhancing film may be applied to a display device such as a liquid crystal display (LCD) device, and a pressure-sensitive adhesive may be used for laminating such optical members on each other, or applying such an optical member to the display device, for example, adhering the optical member to a liquid crystal panel.

For example, pressure-sensitive adhesives that can be used with an optical member are disclosed in Korean Patent Nos. 0831558 and 1171976. As shown in Korean Patent Nos. 0831558 and 1171976, a pressure-sensitive adhesive used for an optical member requires pressure-sensitive adhesive durability and reliability, workability or light leakage preventability at high temperature or at high temperature and high humidity.

Recently, a notable physical property for a thinner display device such as an LCD device is bending preventability. That is, when an optical member such as a polarizing plate is adhered to a liquid crystal panel using a pressure-sensitive adhesive, prevention of bending the panel may be required. To provide bending preventability to a conventionally known pressure-sensitive adhesive for an optical member, it is easy to consider reducing a gel content, that is, a crosslinking degree, but in this case, durability may be reduced.

In addition, the pressure-sensitive adhesive composition may be stored for a somewhat long time before being applied, and thus storage stability is also a critically required physical property.

SUMMARY OF THE INVENTION

The present invention is directed to providing a pressure-sensitive adhesive composition, an optical membrane, a polarizing plate and a display device.

In one aspect, the present invention provides a pressure-sensitive adhesive composition, which includes a block copolymer and an antioxidant, or a block copolymer and a photostabilizer.

The term "block copolymer" used herein may refer to a copolymer including blocks of different polymerized monomers.

The block copolymer may include a first block having a relatively high glass transition temperature and a second block having a relatively low glass transition temperature. The block copolymer including the first and second blocks may form a fine phase separation region in a crosslinking structure of the pressure-sensitive adhesive, and can control physical properties by controlling a glass transition temperature of the block forming each region. For example, the first block may have a glass transition temperature of 50 to 100° C., and the second block may have a glass transition temperature of −30° C. or less. The The block copolymer including at least two blocks may form, for example, a fine phase separation structure in a pressure-sensitive adhesive. Such a block copolymer may exhibit suitable cohesive strength and stress relaxation according to a temperature change, and thus a pressure-sensitive adhesive excellently maintaining physical properties required for an optical film including durability and reliability, leakage preventability and reworkability may be formed.

The fine phase separation structure formed by such a block copolymer may exhibit excellent cohesive strength and stress relaxation according to temperature or humidity change, and thus physical properties required for an optical member such as durability and reliability, light leakage preventability and reworkability may be excellently maintained. In addition, as a stress relaxation characteristic is enhanced due to the above range of the glass transition temperature of the first block having a relatively high glass transition temperature, bending is suitably inhibited, and a cohesive strength is ensured, other physical properties such as durability may also be stably maintained.

In the block copolymer, the first block may have a number average molecular weight (Mn) of, for example, 3,000 to 200,000. The number average molecular weight (Mn) of the first block may refer to a number average molecular weight of a polymer prepared by polymerizing only a monomer for forming the first block. The "number average molecular weight" described herein may be measured by, for example, a method described in Example using gel permeation chromatography (GPC). In another example, the number average molecular weight of the first block may be 5,000 or more, 7,000 or more, 9,000 or more, 11,000 or more, 13,000 or more, 15,000 or more, 17,000 or more, 19,000 or more, 21,000 or more, 23,000 or more, or 25,000 or more. In addition, the number average molecular weight of the first block may be, in another example, 150,000, 100,000, 90,000, 80,000, 70,000, 60,000, 50,000, 40,000, or 35,000 or less. In addition, the first block may have a polydispersity index (PDI; Mw/Mn), that is, a ratio (Mw/Mn) of a weight average molecular weight (Mw) to a number average molecular weight (Mn), of approximately 1.0 to 2.0 or 1.0 to 1.7. The block copolymer may have a number average molecular weight of 50,000 to 300,000. The number average molecular weight of the block copolymer may be, in another example, 70,000 or more, 90,000 or more or 100,000 or more. In addition, the number average molecular weight of the block copolymer may be, in another example, 250,000 or less, 200,000 or less, or 160,000 or less. The polydispersity index (PDI; Mw/Mn) of the block copolymer may be in a range of approximately 1.0 to 3.0 or 1.5 to 2.5. A pressure-sensitive adhesive composition or pressure-sensitive adhesive having excellent physical properties may be provided by controlling a molecular weight characteristic as described above.

A block copolymer may be a crosslinkable copolymer having a crosslinkable functional group. The crosslinkable functional group may be a hydroxyl group, a carboxyl group, an isocyanate group or a glycidyl group, and generally, a hydroxyl group.

A crosslinkable functional group may be included in, for example, the second block having a relatively low glass transition temperature. In one example, a crosslinkable functional group may not be included in the first block of the block copolymer, but included in the second block. When the crosslinkable functional group is included in the second block, suitable cohesive strength and stress relaxation may be exhibited according to temperature change, and thus a pressure-sensitive adhesive having excellently maintained physical properties required for an optical member such as durability and reliability, light leakage preventability and reworkability may be formed.

In the block copolymer, types of monomers for forming the first and second blocks are not particularly limited as long as the above ranges of glass transition temperatures are ensured by a combination of the monomers.

In one example, the first block may include a polymerization unit of a (meth)acrylic acid ester monomer. The "polymerization unit of a monomer or polymerization unit of a compound" used herein may refer to the fact that the monomer or compound forms a backbone, such as a main chain or a side chain, of the polymer or a block through a polymerization reaction. As the (meth)acrylic acid ester monomer, for example, an alkyl (meth)acrylate may be used. In one example, in consideration of controlling a cohesive strength, a glass transition temperature and a pressure-sensitive adhesive property, an alkyl (meth)acrylate having an alkyl group having 1 to 20, 1 to 16, 1 to 12, 1 to 8 or 1 to 4 carbon atoms may be used. Such a monomer may be methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth) acrylate, and lauryl (meth)acrylate, which may be used alone or a combination of at least two thereof to ensure the glass transition temperature. Although not particularly limited, in consideration of easy control of a glass transition temperature, as the monomer for forming the first block, among the monomers, an alkyl methacrylate, for example, an alkyl methacrylate having an alkyl group having 1 to 20, 1 to 16, 1 to 12, 1 to 8 or 1 to 4 carbon atoms, may be used.

The second block of the block copolymer may include a polymerization unit of a (meth)acrylic acid ester monomer, and for example, in consideration of easy control of a glass transition temperature, among the monomers used in the first block, the alkyl acrylate may be, for example, an alkyl acrylate having an alkyl group having 1 to 20, 1 to 16, 1 to 12, 1 to 8 or 1 to 4 carbon atoms. When a crosslinkable functional group is included in the second block, the second block may further include a polymerization unit of a monomer providing a crosslinkable functional group (hereinafter, a crosslinkable monomer). For example, the second block may include a polymerization unit of 90 to 99.9 parts by weight of a (meth)acrylic acid ester monomer such as the alkyl acrylate and a polymerization unit of 0.1 to 10 parts by weight of a crosslinkable monomer. The unit "parts by weight" used herein may refer to a weight ratio between components. For example, as described above, the expression "the second block includes a polymerization unit of 90 to 99.9 parts by weight of a (meth)acrylic acid ester monomer and a polymerization unit of 0.1 to 10 parts by weight of a crosslinkable monomer" may mean that a weight ratio (A:B) of the (meth)acrylic acid ester monomer (A) forming a polymerized unit of the second block and a crosslinkable monomer (B) is 90 to 99.9:0.1 to 10.

As the (meth)acrylic acid ester monomer forming the second block, a type of a monomer that can ultimately ensure the above range of a glass transition temperature through copolymerization with the copolymerizable monomer may be selected from the monomers that can be included in the first block, and used. In consideration of easy control of the glass transition temperature, as the (meth) acrylic acid ester monomer forming the second block, the alkyl acrylate described above may be used.

The crosslinkable monomer may be a monomer having a site that can be copolymerized with another monomer included in the block copolymer like the (meth)acrylic acid ester monomer, and the above-described crosslinkable functional group, for example, a hydroxyl group. In the preparation of a pressure-sensitive adhesive, various crosslinkable monomers described above are known, and may be used in the polymer. For example, the copolymerizable monomer having a hydroxyl group may be, but is not limited to, a hydroxyalkyl (meth)acrylate such as 2-hydroxyethyl (meth) acrylate, 2-hydroxypropyl (meth)acrylate, 4-hydroxybutyl (meth)acrylate, 6-hyroxyhexyl (meth)acrylate or 8-hydroxyoctyl (meth)acrylate, or a hydroxyalkyleneglycol (meth)acrylate such as 2-hydroxyethyleneglycol (meth) acrylate or 2-hydroxypropyleneglycol (meth)acrylate. In consideration of reactivity with a different monomer forming the second block and easy control of a glass transition temperature, among the monomers described above, a hydroxyalkyl acrylate or hydroxyalkyleneglycol acrylate may be used, but the present invention is not limited thereto.

The first block and/or the second block may further include, when needed, for example, another optional comonomer to control a glass transition temperature, and the monomer may be included as a polymerization unit. The comonomer may be, but is not limited to, a nitrogen-containing monomer such as (meth)acrylonitrile, (meth) acrylamide, N-methyl (meth)acrylamide, N-butoxy methyl (meth)acrylamide, N-vinyl pyrrolidone or N-vinyl caprolactam; an alkylene oxide-containing monomer such as an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, an phenoxy alkyleneglycol (meth)acrylic acid ester, a phenoxy dialkyleneglycol (meth)acrylic acid ester, a phenoxy trialkyleneglycol (meth)acrylic acid ester, a phenoxy tetraalkyleneglycol (meth)acrylic acid ester or a phenoxy polyalkyleneglycol (meth)acrylic acid ester; a styrene-based monomer such as styrene or methyl styrene; a glycidyl-containing monomer such as glycidyl (meth)acrylate; or a carboxyl acid vinyl ester such as vinyl acetate. One or at least two suitable types of the comonomers may be included in the polymer. Such a comonomer may be included in a block copolymer in a ratio of, for example, 20 parts by weight or less, or 0.1 to 15 parts by weight with respect to a weight of another monomer in each block.

The block copolymer may include, for example, 100 to 1,500 parts by weight of the second block with respect to 100 parts by weight of the first block. The second block may be included, in another example, at 200, 300, 400, 500, 600, 700, or 800 parts by weight with respect to 100 parts by weight of the first block. The second block may be included at 1,400, 1,300, 1,200, 1,100, or 1,000 parts by weight with respect to 100 parts by weight of the first block. A weight ratio of the first block and the second block is controlled as described above, thereby providing a pressure-sensitive adhesive composition and a pressure-sensitive adhesive having excellent physical properties.

In one example, the block copolymer may be a diblock copolymer including the first and second blocks, that is, a block copolymer including only two blocks such as the first and second blocks. As the diblock copolymer is used, durability and reliability, stress relaxation and reworkability of the pressure-sensitive adhesive may be more excellently maintained.

A method of preparing a block copolymer may be a conventional method without particular limitation. The block polymer may be polymerized by living radical polymerization (LRP), for example, a suitable one selected from anion polymerization for synthesis in the presence of an alkali metal or an inorganic salt such as an alkali earth metal salt using an organic rare earth metal complex or an organic alkali metal compound as a polymerization initiator, anion polymerization for synthesis in the presence of an organic aluminum compound using an organic alkali metal compound as a polymerization initiator, atom-transfer radical polymerization (ATRP) using an atom-transfer radical polymerizer as a polymerization controller, activators regenerated by electron transfer (ARGET) ATRP for synthesis in the presence of an organic or inorganic reducing agent generating electrons using an atom-transfer radical polymerizer as a polymerization controller, initiators for continuous activator regeneration (ICAR) ATRP, reversible addition fragmentation chain transfer (RAFT) polymerization using an inorganic reducing agent addition-opening chain transferring agent, and a method using an organic tellurium compound as an initiator.

The pressure-sensitive adhesive composition includes an antioxidant or a photostabilizer. Such an antioxidant or photostabilizer may suppress an increase in time-based viscosity of a main component, thereby ensuring storage stability, and prevent a decrease in a physical property of the pressure-sensitive adhesive layer according to time after a reaction with a crosslinkable agent.

The antioxidant or photostabilizer may be included in the pressure-sensitive adhesive at approximately 0.01 parts by weight with respect to 100 parts by weight of the block copolymer. In another example, the antioxidant or photostabilizer may be included at approximately 0.05, 0.07, 0.1 or 0.15 parts by weight. The upper limit of the ratio of the antioxidant or photostabilizer is not particularly limited, and thus the antioxidant or photostabilizer may be included in the pressure-sensitive adhesive composition, for example, at approximately 3, 2.5, or 2 parts by weight or less, or approximately 1.5 parts by weight. An effect of addition such as storage stability may be ensured by controlling the ratio of the antioxidant or photostabilizer, and a decrease in physical properties through elution of the antioxidant or photostabilizer or phase separation caused thereby may be prevented.

The antioxidant may be, for example, a known antioxidant such as a phenol-based antioxidant, a phosphite-based antioxidant or a thioether-based antioxidant, which may be used alone or in a combination thereof. In consideration of heat resistance, weather resistance and compatibility, a phenol-based antioxidant, for example, a hindered phenol-based antioxidant, may be used.

The phenol-based antioxidant may be a compound having CAS No. 27676-62-6, 1843-03-4, 85-60-9, 2082-79-3, 6683-19-8, 36443-68-2, 90498-90-1 (ADK STAB AO-80), 1709-70-2, 41484-35-9, 23128-74-7, 125643-61-0, 134701-20-5, 976-56-7, 65140-91-2, 110553-27-0, 35074-77-2, 40601-76-1, 68411-46-1 or 991-84-4, the phosphite-based antioxidant may be a compound having CAS No. 52664-24-1, 3806-34-6, 26741-53-7, 80693-00-1, 126050-54-2 (ADK STAB HP-10), 31570-04-4, 13003-12-8 or 26523-78-4, and the thioether-based antioxidant may be a compound having CAS No. 66534-05-2, 71982-66-6(ADK STAB AO-23), 29598-76-3 or 10595-72-9, but the present invention is not limited thereto.

The photostabilizer may be, for example, a hindered amine compound.

The photostabilizer may be, for example, a compound represented by Formula A:

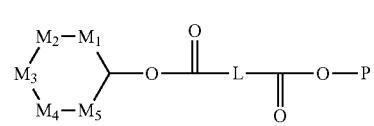

[Formula A]

In Formula A, $M_1$ to $M_5$ are each independently $R^1$—N, $(R^2)(R^3)$—C, or $(R^4)(R^5)$—C, in which $R^1$ is a hydrogen atom, an alkyl group, or an alkoxy group, $R^2$ and $R^3$ are each independently an alkyl group, $R^4$ and $R^5$ are each independently a hydrogen atom or an alkyl group, L is an alkylene group or an alkylidene group, and P is an alkyl group or a substituent of Formula B. In Formula A, at least one of $M_2$ to $M_4$ is $R^1$—N, and $M_1$, $M_2$, $M_3$, $M_4$, or $M_5$ immediately adjacent to $M_2$, $M_3$, or $M_4$ that is $R^1$—N may be $(R^2)(R^3)$—C.

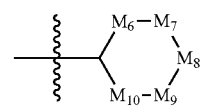

[Formula B]

In Formula B, $M_6$ to $M_{10}$ are each independently $R^1$—N, $(R^2)(R^3)$—C, or $(R^4)(R^5)$—C, in which $R^1$ is a hydrogen atom, an alkyl group, or an alkoxy group, $R^2$ and $R^3$ are each independently an alkyl group, and $R^4$ and $R^5$ are each independently a hydrogen atom or an alkyl group. In Formula B, at least one of $M_7$ to $M_9$ is $R^1$—N, and $M_6$, $M_7$, $M_8$, $M_9$, or $M_{10}$ immediately adjacent to $M_7$, $M_8$, or $M_9$ may be $(R^2)(R^3)$—C.

In Formulas A and B, the expression "$M_1$ to $M_{10}$ are $R^1$—N, $(R^2)(R^3)$—C, or $(R^4)(R^5)$—C" may mean that a nitrogen (N) atom or a carbon (C) atom is present at the position of $M_1$ to $M_{10}$, and a substituent selected from $R^1$ to $R^5$ binds to the nitrogen atom or the carbon atom.

In Formula B, the mark

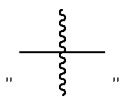

means that the carbon atom of Formula B linked to the mark binds to the oxygen atom of Formula A.

In Formula A, the alkylene group or alkylidene group, that is, L, may be substituted or unsubstituted when needed. For example, L may be substituted by an aryl group, which may be, but is not limited to, a 3,5-bis(1,1-dimethylethyl)-4-hydroxyphenyl group.

In Formula A, $R^1$ may be, for example, a hydrogen atom, an alkyl group having 1 to 8 or 1 to 4 carbon atoms, or an alkoxy group having 4 to 16, or 4 to 12 carbon atoms. The alkyl group or the alkoxy group may be linear or branched, and may be substituted by at least one substituent.

In Formula A, $R^2$, $R^3$, and P may be each independently an alkyl group having 1 to 12, 1 to 8, or 1 to 4 carbon atoms. The alkyl group may be linear or branched, and may be substituted by at least one substituent.

In addition, in Formula A, $R^4$ and $R^5$ may be hydrogen atoms.

In addition, in Formula A, L may be, for example, an alkylene group having 4 to 12 or 6 to 10 carbon atoms, or an alkylidene group having 2 to 10 or 4 to 8 carbon atoms. The alkylene group or alkylidene group may be linear or branched, and may be substituted by at least one substituent.

The compound of Formula A may be, but is not limited to, for example, bis(1,2,2,6,6-pentamethyl-4-piperidyl)sebacate, methyl 1,2,2,6,6-pentamethyl-4-piperidyl sebacate, propanedioic acid, 2-[[3,5-bis(1,1-dimethylethyl)-4-hydroxyphenyl]methyl]-2-butyl-1,3-bis(1,2,2,6,6-pentamethyl-4-piperidinyl) ester, bis(2,2,6,6-tetramethyl-4-piperidyl)sebacate, or bis-(1-octyloxy-2,2,6,6-tetramethyl-4-piperidinyl)sebacate.

The pressure-sensitive adhesive composition including an antioxidant or photostabilizer may exhibit excellent storage stability. For example, the pressure-sensitive adhesive composition may have a viscosity change maintained at 60° C. for 30 days of 30, 25, 20, 15, 10 or 5% or less. Here, the viscosity change may be calculated by the following Equation 1, and the viscosity change may be a value measured with respect to the pressure-sensitive adhesive composition before crosslinking:

Viscosity change=$100 \times (V_1 - V_o)/V_o$     [Equation 1]

In Equation 1, $V_1$ is a viscosity of the pressure-sensitive adhesive composition immediately after being maintained at 60° C. for 30 days, and $V_o$ is a viscosity of the pressure-sensitive adhesive composition before being maintained at 60° C. for 30 days.

The pressure-sensitive adhesive composition may further include a crosslinking agent that can crosslink a block copolymer. As the crosslinking agent, a crosslinking agent having at least two functional groups that can react with a crosslinkable functional group included in the block copolymer may be used. Such a crosslinking agent may be an isocyanate crosslinking agent, an epoxy crosslinking agent, an aziridine crosslinking agent or a metal chelate crosslinking agent, and preferably, an isocyanate crosslinking agent.

The isocyanate crosslinking agent may be a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting the diisocyanate compound with a polyol, and here, the polyol may be, for example, trimethylol propane.

The pressure-sensitive adhesive composition may be one or at least two of the above-described crosslinking agents, but the present invention is not limited thereto.

The multifunctional crosslinking agent maybe included in the pressure-sensitive adhesive composition at 0.01 to 10 or 0.01 to 5 parts by weight with respect to 100 parts by weight of the block copolymer, and within such a range, a gel fraction, a cohesive strength, a pressure-sensitive adhesive strength and durability of the pressure-sensitive adhesive may be excellently maintained.

The pressure-sensitive adhesive composition may further include a silane coupling agent. As the silane coupling agent, for example, a silane coupling agent having a β-cyano group or an acetoacetyl group may be used. For example, such a silane coupling agent may allow a pressure-sensitive adhesive formed by a copolymer having a low molecular weight to exhibit an excellent cohesive property and adhesive stability, and to excellently maintain durability and reliability under heat resistance, and humidity and heat resistance conditions.

As the silane coupling agent having a β-cyano group or an acetoacetyl group, for example, a compound represented by Formula 1 or 2 may be used.

$(R_1)_n Si(R_2)_{(4-n)}$     [Formula 1]

$(R_3)_n Si(R_2)_{(4-n)}$     [Formula 2]

In Formula 1 or 2, $R_1$ is a β-cyanoacetyl group or a β-cyanoacetylalkyl group, $R_3$ is an acetoacetyl group or an acetoacetylalkyl group, $R_2$ is an alkoxy group, and n is a number of 1 to 3.

In Formula 1 or 2, the alkyl group may be an alkyl group having 1 to 20, 1 to 16, 1 to 12, 1 to 8 or 1 to 4 carbon atoms, and such an alkyl group may be linear, branched or cyclic.

In Formula 1 or 2, the alkoxy group may be an alkoxy group having 1 to 20, 1 to 16, 1 to 12, 1 to 8 or 1 to 4 carbon atoms, and such an alkoxy group may be linear, branched or cyclic.

In Formula 1 or 2, n may be, for example, 1 to 3, 1 to 2 or 1.

The compound of Formula 1 or 2 may be, but is not limited to, for example, acetoacetylpropyl trimethoxy silane, acetoacetylpropyl triethoxy silane, β-cyanoacetylpropyl trimethoxy silane or β-cyanoacetylpropyl triethoxy silane.

In the pressure-sensitive adhesive composition, the silane coupling agent may be included at 0.01 to 5 or 0.01 to 1 part by weight with respect to 100 parts by weight of the block copolymer, and within such a range, desired physical properties may be effectively provided to the pressure-sensitive adhesive.

The pressure-sensitive adhesive composition may further include a tackifier when needed. The tackifier may be, but is not limited to, a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination of at least two thereof. The tackifier may be included in the pressure-sensitive adhesive composition at 100 parts by weight or less with respect to 100 parts by weight of the block copolymer.

The pressure-sensitive adhesive composition may further include at least one additive selected from the group consisting of an epoxy resin, a curing agent, a coloring agent, a reinforcing agent, a filler, a foaming agent, a surfactant and a plasticizer when needed.

The pressure-sensitive adhesive composition may be a pressure-sensitive adhesive composition for an optical member. The pressure-sensitive adhesive composition for an optical member may be used to, for example, laminate an optical film such as a retardation film, an antiglare film, a wide viewing angle compensation film or a brightness-enhancing film, or adhere the optical film or a laminate thereof to an adherend such as a liquid crystal panel. In one example, the pressure-sensitive adhesive composition may be a pressure-sensitive adhesive composition for a polarizing plate, which is used to adhere a polarizer to a liquid crystal panel.

In another aspect, the present invention provides a pressure-sensitive adhesive optical laminate. The optical laminate may include an optical film; and a pressure-sensitive adhesive layer formed on one or both surface of the optical film. The pressure-sensitive adhesive layer may be, for example, a pressure-sensitive adhesive layer to adhere the optical film to a liquid crystal panel of an LCD device or another optical film. In addition, the pressure-sensitive adhesive layer may include the above-described pressure-sensitive adhesive composition of the present invention. The pressure-sensitive adhesive composition may be included in the pressure-sensitive adhesive layer while a crosslinking structure is implemented. Here, as the optical film, a polarizer, a retardation film, a brightness-enhancing film, or a laminate in which at least two thereof are stacked may be used.

In still another aspect, the present invention provides a pressure-sensitive adhesive polarizing plate. The polarizing plate may have, for example, a structure in which the optical film is a polarizer in the pressure-sensitive adhesive optical laminate.

A type of the polarizer included in the polarizing plate is not particularly limited, and thus, for example, a general type known in the art such as a polyvinyl alcohol-based polarizer may be employed without limitation.

The polarizer is a functional film or sheet that can extract only light oscillating in one direction from incident light oscillating in various directions. Such a polarizer may be, for example, a form in which a dichroic dye is adsorbed and oriented on a polyvinyl alcohol-based resin film. The polyvinyl alcohol-based resin constituting a polarizer may be obtained by, for example, gelating a polyvinylacetate-based resin. In this case, in the polyvinylacetate-based resin that can be used, in addition to a homopolymer of vinyl acetate, a polymer of vinyl acetate and a different monomer copolymerizable therewith may be included. Here, an example of a monomer that can be copolymerized with vinyl acetate may be, but is not limited to, one or a combination of at least two of unsaturated carbonic acids, olefins, vinyl ethers, unsaturated sulfonic acids, and acryl amides having an ammonium group. A degree of gelation of the polyvinyl alcohol-based resin may be approximately 85 to 100 mol %, and preferably 98 mol % or more. The polyvinyl alcohol-based resin may be further modified, and for example, polyvinyl formal or polyvinyl acetal modified by aldehydes may also be used. In addition, a degree of polymerization of the polyvinyl alcohol-based resin may be approximately 1,000 to 10,000, and preferably 1,500 to 5,000.

The polarizer may be formed by a process of elongating (e.g., uniaxial elongation) the polyvinyl alcohol-based resin film, a process of dying the polyvinyl alcohol-based resin film with a dichroic dye and adsorbing the dichroic dye, a process of treating the polyvinyl alcohol-based resin film to which the dichroic dye is adsorbed with a boric acid aqueous solution, and a process of washing the polyvinyl alcohol-based resin film treated with the boric acid aqueous solution. Here, as the dichroic dye, iodine or a dichroic organic dye may be used.

The polarizing plate may further include a protective film adhered to one or both surfaces of the polarizer, and in this case, the pressure-sensitive adhesive layer may be formed on one surface of the protective film. A type of the protective film is not particularly limited, and for example, one or a laminate including at least two of a cellulose-based film such as triacetyl cellulose (TAC); a polyester-based film such as a polycarbonate film or poly(ethylene terephthalate) (PET) film; a polyethersulfone-based film; a polyethylene film, a polypropylene film, and a polyolefin film having a cyclic or norbornene structure, and an ethylene propylene polymer may be used.

The polarizing plate may further include at least one functional layer selected from the group consisting of a protective layer, a reflective layer, a glare-proof layer, a retardation plate, a wide viewing angle compensation film and a brightness-enhancing film.

In the present invention, a method of forming a pressure-sensitive adhesive layer on the polarizing plate or optical film may be, but is not particularly limited to, for example, directly coating the pressure-sensitive adhesive composition on a polarizing plate or optical film and curing the coated composition to implement a crosslinking structure, or coating the pressure-sensitive adhesive composition on a release-treated surface of a releasing film, curing the coated composition to form a crosslinking structure, and transferring the cured result to a polarizing plate or optical film.

Here, a method of coating the pressure-sensitive adhesive composition may be, but is not particularly limited to, a method of coating the pressure-sensitive adhesive composition using a conventional means such as a bar coater.

During the coating process, a multifunctional crosslinking agent included in the pressure-sensitive adhesive composition is preferably controlled to prevent a crosslinking reaction at a functional group in terms of a uniform coating process, and therefore, the crosslinking agent may form a crosslinking structure during curing and aging processes after coating to enhance a cohesive strength of a pressure-sensitive adhesive, a pressure-sensitive adhesive property and cuttability.

The coating process may also be performed after sufficiently removing a volatile component in the pressure-sensitive adhesive composition or a bubbling component such as a reaction residue, and therefore, it may prevent a decrease in a modulus of elasticity due to excessively low crosslinking density or molecular weight of the pressure-sensitive adhesive, and a scatterer that may be formed therein due to growing bubbles between a glass plate and a pressure-sensitive adhesive layer at a high temperature.

After the coating process, a method of implementing a crosslinking structure by curing the pressure-sensitive adhesive composition may be, but is not particularly limited to, a method of maintaining a coating layer at a suitable temperature to induce a crosslinking structure of a block copolymer and a multifunctional crosslinking agent, which are included in the coating layer.

In yet another aspect, the present invention provides a display device, which includes the optical laminate or a polarizing plate. As a representative example of the display device, an LCD device is used. The exemplary display device is an LCD device, which may include a liquid crystal panel, and the polarizing plate or optical laminate adhered to one or both surfaces of the liquid crystal panel. The polarizing plate or optical laminate may be adhered to the liquid crystal panel using the above-described pressure-sensitive adhesive.

As the liquid crystal panel, for example, a known panel such as a twisted nematic (TN)-mode, super twisted nematic (STN)-mode, ferroelectric (F)-mode, and polymer dispersed LCD (PD LCD)-mode panel; all types of active matrix panels including a two terminal-mode and three terminal-mode panel; an in-plane switching (IPS)-mode panel; and a vertically aligned (VA)-mode panel may be applied.

In addition, types of other components of the LCD device, for example, upper and lower substrates such as a color filter substrate or an array substrate, are not particularly limited either, and any components known in the art may be employed without limitation.

DETAILED DESCRIPTION OF EXEMPLARY EMBODIMENTS

Hereinafter, a pressure-sensitive adhesive composition will be described in detail with reference to examples and comparative examples, but the scope of the pressure-sensitive adhesive composition is not limited to the following examples.

1. Evaluation of Molecular Weight

A number average molecular weight (Mn) and a polydispersity index (PDI) were measured under the following conditions using GPC, standard polystyrene produced by Agilent System was used to draw a calibration curve, and measurement results were converted.

<Measurement Conditions>
Measuring Tool: Agilent GPC (Agilent 1200 series, U.S.)
Column: Two connected PL mixed B
Column Temperature: 40° C.
Eluent: Tetrahydrofuran (THF)
Flow Rate: 1.0 mL/min
Concentration: ~1 mg/mL (100 μL injection)

2. Evaluation of Viscosity

Viscosity was evaluated by the following method using a Brookfield digital viscometer (DV-I+, DV-II+Pro).

<Sequence of Measuring Viscosity>
1) 180 mL of a sample was put in a beaker, and maintained under a constant temperature/constant humidity (23° C./50% relative humidity) condition for approximately 1 hour to remove bubbles.
2) A spindle was put in the sample at an angle not to have bubbles such that a liquid surface of the sample was not lower than a groove of the spindle.
3) The spindle was connected to a viscometer, and adjusted such that the groove of the spindle matched the liquid surface of the sample.
4) A set speed key was pressed to choose RPM of the spindle.
5) A motor on/off key was pressed to operate the viscometer.

After a viscosity shown on a screen was stabilized, a value was obtained. RPM at which a confidence interval was approximately 10% or more was detected on the display and fixed, thereby measuring a viscosity.

3. Evaluation of Durability

A polarizing plate formed in Example or Comparative Example was cut to a size of approximately 180 mm×320 mm (width×length) to prepare a specimen, and then the specimen was adhered to a commercially available 19-inch panel. Afterward, the panel was stored in an autoclave (50° C., 5 atm) for approximately 20 minutes, thereby preparing a sample. Humidity, heat resistance and durability of the prepared sample were evaluated under the following criteria by maintaining the sample at 60° C. and a relative humidity of 90% for 500 hours, and observing generation of bubbles and peel-off at a pressure-sensitive adhesive interface. Heat resistance and durability were evaluated under the following criteria by maintaining the sample at 90° C. for 300 hours, and observing generation of bubbles and peel-off.

<Evaluation Criteria>
A: There were no bubbles or peel-off.
B: There were some bubbles and/or peel-off.
C: There was a great amount of bubbles and/or peel-off.

4. Calculation of Glass Transition Temperature

A glass transition temperature (Tg) of each block of a block copolymer was calculated according to the following equation.

$$1/Tg = \Sigma Wn/Tn \qquad \text{<Equation>}$$

In the equation, Wn was a weight fraction of a monomer used in each block, and Tn was a glass transition temperature detected when the used monomer formed a homopolymer.

That is, in the equation, the right side was a result obtained by summarizing values (Wn/Tn) obtained by dividing a weight fraction of the used monomer by a glass transition temperature detected when each monomer formed a homopolymer.

5. Measurement of Conversion Ratio and Component Ratio of Monomer

A conversion ratio in a polymerization process of a main monomer for forming a first block, methyl methacrylate (MMA), and a main monomer for forming a second block, butyl acrylate (BA), in a block copolymer of Example or Comparative Example and component contents in the block copolymer were calculated by the following equation according to the 1H-NMR result.

$$\text{MMA conversion ratio (\%)} = 100 \times B/(A+B) \qquad \text{<MMA Conversion Ratio>}$$

Here, A was an area of a peak (approximately 3.4 to 3.7 ppm) derived from a methyl group induced from MMA included in a polymer in a 1H-NMR spectrum, and B was an area of a peak (approximately 3.7 ppm) derived from a methyl group of MMA which was not polymerized. That is, in consideration of a migration position of a methyl group peak in the MMA structure, a conversion ratio of the monomer was calculated.

$$\text{BA conversion ratio (\%)} = 100 \times C/(C+D) \qquad \text{<BA Conversion Ratio>}$$

Here, D was an area of a peak (approximately 5.7 to 6.4 ppm) derived from $=CH_2$ at a double bonded terminal end of BA in the 1H-NMR spectrum, and C was an area of a peak (approximately 3.8 to 4.2 ppm) derived from $—OCH_2—$ present in a polymer formed by polymerization of BA. That is, the BA conversion ratio was measured by calculating relative values of $=CH_2$ peak formed by a double bond of BA and $—OCH_2—$ peak of the polymer.

<Estimation of Component Ratio>

Ratios of the first block and the second block of the block copolymer were calculated by the following equation based on ratios of MMA and BA, which were main monomers used to form the first and second blocks.

$$\text{Content ratio (\%) of MMA in block copolymer} = 100 \times \text{MMA peak area/BA peak area} \qquad \text{<Equation>}$$

Here, the MMA peak area was an area value per 1H proton of a peak detected at approximately 3.4 to 3.7 ppm in 1H NMR (the peak observed by —CH₃ derived from MMA), and the BA peak area was an area value per 1H proton of a peak detected at approximately 3.8 to 4.2 ppm in 1H NMR (the peak observed by —OCH₂— present in a polymer formed by BA).

That is, the weight ratios of the first block and the second block were estimated by calculating relative values of the —CH₃ peak of the MMA structure and the —OCH₂— peak of the polymer formed from BA.

6. Evaluation of Degree of Bending

A polarizing plate formed in Example or Comparative Example was cut to a size of 240 mm×410 mm (width×length), thereby preparing a specimen, and the specimen was adhered to a glass substrate (0.4t glass), thereby forming a laminate. Afterward, the formed laminate was disposed on a flat bottom and maintained at 60° C. for 72 hours, and then a degree of bending was evaluated by measuring a height of the laminate from the bottom.

Preparation Example 1. Preparation of Block Copolymer (A)

A monomer mixture including MMA and butyl methacrylate (BMA) in a weight ratio of 7:3 (MMA:BMA) as a monomer for forming a first block was mixed with suitable amounts of ethyl 2-bromoisobutyrate (EBiB) and ethyl acetate (EAc). A flask containing the mixture was sealed with a rubber membrane, nitrogen purging and stiffing were performed at approximately 25° C. for approximately 30 minutes, and remaining oxygen was removed by bubbling. Afterward, the mixture of CuBr₂, tris(2-pyridylmethyl) amine (TPMA) and 2,2'-azobis(2,4-dimethyl valeronitrile) (V-65), from which the suitable amount of oxygen was removed, was added and dipped in a reaction vessel at approximately 67° C. to initiate a reaction (polymerization of the first block). When a conversion ratio of MMA approached approximately 75%, a mixture for forming a second block previously bubbled with nitrogen was added in the presence of nitrogen. The mixture for forming the second block was prepared by dissolving butyl acrylate (BA) and hydroxybutyl acrylate (HBA) in a solvent such as ethyl acetate (EAc) in a weight ratio of 99.5:0.5 (BA:HBA) as a monomer mixture. Afterward, suitable amounts of CuBr₂, TPMA and V-65 were further added in a reaction flask, and a chain extension reaction was performed (polymerization of second block). When a conversion ratio of the monomer (BA) approached 80% or more, the reaction mixture was exposed to oxygen and diluted in a suitable solvent to terminate the reaction, resulting in a block copolymer (in this process, V-65 was divided into suitable portions and added until the time at which the reaction was terminated in consideration of a half life of V-65).

Preparation Examples 2 to 7. Preparation of Block Copolymers (A2 to 4A and B1 to B3)

Block copolymers were prepared by the same method as described in Preparation Example 1, except that monomers used in polymerization of first and second blocks and ratios thereof were controlled as shown in Table 1. EbiB, EA, CuBr₂, TPMA and V-65 corresponding to a catalyst, a solvent, and an initiator in the preparation of the block copolymer, respectively, were added at a suitable amount in consideration of polymerization efficiency.

TABLE 1

| | | Ingredients of first block (weight ratio) | | | Ingredients of second block (weight ratio) | |
|---|---|---|---|---|---|---|
| | | MMA | BMA | HPMA | BA | HBA |
| B | A1 | 70 | 30 | — | 99.5 | 0.5 |
| C | A2 | 80 | 20 | — | 97 | 3 |
| P | A3 | 60 | 40 | — | 94 | 6 |
| | A4 | 70 | 30 | — | 95 | 5 |
| | B1 | 10 | — | — | 99.5 | 0.5 |
| | B2 | 81 | 16 | 3 | 100 | — |
| | B3 | 81 | 16 | 3 | 97 | 3 |

Weight ratio: ratio when total of weights of monomers was set to 100
MMA: methyl methacrylate (homopolymer Tg: approximately 110° C.)
BMA: butyl methacrylate(homopolymer Tg: approximately 27° C.)
HPMA: 2-hydroxypropyl methacrylate (homopolymer Tg: approximately 26° C.)
BA: butyl acrylate (homopolymer Tg: approximately −45° C.)
HBA: 4-hydroxybutyl acrylate (homopolymer Tg: approximately −80° C.)

Characteristics of the block copolymer prepared by the above method are shown in Table 2.

TABLE 2

| | | block copolymer | | | | | | |
|---|---|---|---|---|---|---|---|---|
| | | A1 | A2 | A3 | A4 | B1 | B2 | B3 |
| First block | MMA ratio | 70 | 80 | 60 | 70 | 100 | 81 | 81 |
| | BMA ratio | 30 | 20 | 40 | 30 | 0 | 16 | 16 |
| | HPMA ratio | 0 | 0 | 0 | 0 | 0 | 3 | 3 |
| | Tg (° C.) | 80 | 90 | 72 | 80 | 110 | 90 | 90 |
| | Mn(× 10⁴) | 2.9 | 2.3 | 2.9 | 3.8 | 2.3 | 2.3 | 2.3 |
| | PDI | 1.38 | 1.34 | 1.38 | 1.41 | 1.36 | 1.36 | 1.36 |
| Second block | BA ratio | 99.5 | 97 | 94 | 95 | 97.0 | 100.0 | 97.0 |
| | HBA ratio | 0.5 | 3 | 6 | 5 | 3.0 | 0.0 | 3.0 |
| | Tg (° C.) | −45 | −46.2 | −47.5 | −47 | −46.2 | −45 | −46.2 |
| Block copolymer | Mn(× 10⁴) | 12.3 | 12.3 | 14.1 | 10.4 | 12.4 | 12.4 | 12.2 |
| | PDI | 2.2 | 1.8 | 2.1 | 2.1 | 1.9 | 1.8 | 1.8 |
| | Weight ratio of block | 10:90 | 10:90 | 11.2:88.8 | 34.7:65.3 | 10:90 | 10:90 | 10:90 |

Monomer ratio unit: parts by weight (based on total of 100)
BA: butyl acrylate (homopolymer Tg: approximately −45° C.)
HBA: 4-hydroxybutyl acrylate (homopolymer Tg: approximately −80° C.)
MMA: methyl methacrylate (homopolymer Tg: approximately 110° C.)
BMA: butyl methacrylate(homopolymer Tg: approximately 27° C.)
HPMA: 2-hydroxypropyl methacrylate (homopolymer Tg: approximately 26° C.)
Tg: glass transition temperature
Mn: number average molecular weight
PDI: polydispersity index
Block weight ratio: first block: second block(weight ratio)

Preparation Example 8. Preparation of Random Copolymer (B4)

10 parts by weight of MMA, 87.3 parts by weight of n-butyl acrylate, and 2.7 parts by weight of 4-hydroxybutyl acrylate were added in a 1 L reaction vessel equipped with a cooling device to perform a reflux of nitrogen gas and facilitate temperature control, 200 ppm of n-dodecyl mercaptanol was added as a molecular weight controller, and then 120 parts by weight of ethyl acetate was added as a solvent. Subsequently, nitrogen gas was purged for approximately 60 minutes to remove oxygen, 0.05 parts by weight of azobisisobutyronitrile (AIBN) was added as a reaction initiator at 60° C., and a reaction was performed for approximately 8 hours, thereby preparing a random copolymer. A number average molecular weight (Mn) of the prepared random copolymer (B4) was approximately 132000, and a polydispersity index (PDI) was approximately 4.6.

Example 1

Preparation of Coating Solution (Pressure-Sensitive Adhesive Composition)

A coating solution (pressure-sensitive adhesive composition) was prepared by mixing 0.1 parts by weight of a crosslinking agent (Coronate L, NPU, Japan), 0.1 parts by weight of dibutyltin dilaurate (DBTDL) and 0.2 parts by weight of a phenol-based antioxidant (Irganox1010, Ciba), and blending ethyl acetate as a solvent.

Preparation of Pressure-Sensitive Adhesive Polarizing Plate

The prepared coating solution was coated on a release-treated surface of a release-treated release poly(ethylene terephthalate) (PET) (MRF-38, Mitsubishi) having a thickness of 38 μm such that a thickness after drying became approximately 23 μm, and maintained in an oven at 110° C. for approximately 3 minutes. After drying, a coating layer formed on the release PET was laminated on a WV liquid crystal layer of a polarizing plate (laminate of TAC/PVA/TAC; TAC=triacetylcellulose, PVA=polyvinylalcohol-based polarizing film) on one side of which a wide view (WV) liquid crystal layer was coated, thereby preparing a pressure-sensitive adhesive polarizing plate.

Examples 2 to 5 and Comparative Examples 1 to 5

A pressure-sensitive adhesive composition (coating solution) and a pressure-sensitive adhesive polarizing plate were formed by the same method as described in Example 1, except that components and ratios in preparation of the pressure-sensitive adhesive composition (coating solution) were controlled as shown in Table 3 or 4.

TABLE 3

| | | Examples | | | | | | |
|---|---|---|---|---|---|---|---|---|
| | | 1 | 2 | 3 | 4 | 5 | 6 | 7 |
| Acrylic polymer | Type | A1 | A1 | A2 | A3 | A4 | A1 | A2 |
| | Content | 100 | 100 | 100 | 100 | 100 | 100 | 100 |
| Content of crosslinking agent | | 0.1 | 0.1 | 0.07 | 0.2 | 0.2 | 0.1 | 0.07 |
| Content of DBTDL | | 0.1 | 0.1 | 0.1 | 0.1 | 0.1 | 0.1 | 0.1 |
| Content of antioxidant | | 0.2 | 1 | 0.2 | 0.2 | 0.2 | | |
| Photostabilizer | | | | | | | 0.2 | 1 |

Content unit: parts by weight

Crosslinking agent: Coronate L, NPU, Japan

DBTDL: dibutyltin dilaurate

Antioxidant: phenol-based antioxidant (Irganox1010, Ciba)

TABLE 4

| | | Comparative Examples | | | | |
|---|---|---|---|---|---|---|
| | | 1 | 2 | 3 | 4 | 5 |
| Acrylic polymer | Type | B1 | A1 | B2 | B3 | B4 |
| | Content | 100 | 100 | 100 | 100 | 100 |
| Content of crosslinking agent | | 0.1 | 0.1 | 0.07 | 0.07 | 0.07 |
| Content of DBTDL | | 0.1 | 0.1 | 0.1 | 0.1 | 0.1 |
| Content of antioxidant | | 0.2 | 0 | 0.2 | 0.2 | 0.2 |

Content unit: parts by weight

Crosslinking agent: Coronate L, NPU, Japan

DBTDL: dibutyltin dilaurate

Antioxidant: phenol-based antioxidant (Irganox1010, Ciba)

Viscosity unit of coating solution: cP

Results of evaluating physical properties with respect to Examples and Comparative Examples are shown in Tables 5 and 6.

TABLE 5

| | Examples | | | | | | |
|---|---|---|---|---|---|---|---|
| | 1 | 2 | 3 | 4 | 5 | 6 | 7 |
| Initial viscosity (cP) | 1750 | 1730 | 1760 | 1700 | 1690 | 1740 | 1755 |
| Late viscosity (cP) | 1750 | 1730 | 1760 | 1700 | 1690 | 1745 | 1760 |
| Viscosity change (%) | 0 | 0 | 0 | 0 | 0 | approximately 0.29 | approximately 0.29 |
| Degree of bending (mm) | 37 | 37 | 38 | 36 | 37 | 36 | 35 |
| Heat resistance and reliability | A | A | A | A | A | A | A |
| Humidity and heat resistance and reliability | A | A | A | A | A | A | A |

Initial viscosity: the viscosity measured with respect to a coating solution of a block copolymer and an antioxidant (a crosslinking agent was not blended)
Late viscosity: the viscosity measured immediately after a coating solution whose initial viscosity was measured at 60° C. for 30 minutes

TABLE 6

|  | Comparative Examples | | | | |
| --- | --- | --- | --- | --- | --- |
|  | 1 | 2 | 3 | 4 | 5 |
| Initial viscosity (cP) | 1820 | 1760 | 1760 | 1730 | 1900 |
| Late viscosity (cP) | 1880 | 2530 | 1770 | 1750 | 1900 |
| Viscosity change (%) | approximately 3.3 | approximately 43.8 | approximately 5.7 | approximately 1.16 | 0 |
| Degree of blending (mm) | 49 | 37 | 39 | 39 | 50 |
| Heat resistance and reliability | A | C | C | B | C |
| Humidity and heat resistance and reliability | A | A | C | B | B |

Initial viscosity: the viscosity measured with respect to a coating solution of a block copolymer and an antioxidant (a crosslinking agent was not blended)
Late viscosity: the viscosity measured immediately after a coating solution whose initial viscosity was measured at 60° C. for 30 minutes In the present invention, a pressure-sensitive adhesive composition having physical properties required for an optical member using a particular block copolymer and an antioxidant or a photostabilizer, which forms a fine phase change region in a crosslinking structure, and particularly having excellent bending preventability and storage stability can be provided. Such a pressure-sensitive adhesive composition can be used for optical uses, for example, to laminate various optical members, or apply an optical member to a display device.

While the invention has been shown and described with reference to certain exemplary embodiments thereof, it will be understood by those skilled in the art that various changes in form and details may be made therein without departing from the scope of the invention as defined by the appended claims.

What is claimed is:
1. A pressure-sensitive adhesive polarizing plate, comprising:
a polarizer; and
a pressure-sensitive adhesive layer formed on one or both surfaces of the polarizer, and including a pressure-sensitive adhesive composition which is crosslinked,
wherein the pressure-sensitive adhesive composition prior to crosslinking comprises:
a block copolymer, which is a diblock copolymer including a first block having a glass transition temperature of 70 to 95° C. and a second block having a glass transition temperature of −55 to −45° C. and a crosslinkable functional group; and
an antioxidant,
wherein the first block has a polymerization unit of an alkyl methacrylate, and the second block has a polymerization unit of an alkyl acrylate and a crosslinkable monomer,
wherein the block copolymer includes 100 to 1,500 parts by weight of the second block with respect to 100 parts by weight of the first block, and
wherein the antioxidant is at least one selected from the group consisting of a phenol-based antioxidant and a thioether-based antioxidant,
wherein the antioxidant is included at 0.01 to 3 parts by weight with respect to 100 parts by weight of the block copolymer, and
wherein a viscosity change of the pressure-sensitive adhesive composition prior to crosslinking after being maintained at 60° C. for 30 days is 5% or less.

2. The pressure-sensitive adhesive polarizing plate of claim 1, wherein a difference in glass transition temperature between the first and second blocks of the block copolymer is 80 to 150° C.

3. The pressure-sensitive adhesive polarizing plate of claim 1, wherein the first block has a number average molecular weight of 3,000 to 200,000.

4. The pressure-sensitive adhesive polarizing plate of claim 1, wherein the block copolymer has a number average molecular weight of 50,000 to 300,000.

5. The pressure-sensitive adhesive polarizing plate of claim 1, wherein the block copolymer has a polydispersity index (Mw/Mn) of 1.0 to 3.0.

6. The pressure-sensitive adhesive polarizing plate of claim 1, further comprising a multifunctional crosslinking agent.

7. A pressure-sensitive adhesive optical laminate, comprising:
an optical film; and
a pressure-sensitive adhesive layer formed on one or both surfaces of the optical film and including a pressure-sensitive adhesive composition, which is crosslinked,
wherein the pressure-sensitive adhesive composition prior to crosslinking comprises:
a block copolymer, which is a diblock copolymer including a first block having a glass transition temperature of 70 to 95° C. and a second block having a glass transition temperature of −55 to −45° C. and a crosslinkable functional group; and
an antioxidant,
wherein the first block has a polymerization unit of an alkyl methacrylate, and the second block has a polymerization unit of an alkyl acrylate and a crosslinkable monomer,
wherein the block copolymer includes 100 to 1,500 parts by weight of the second block with respect to 100 parts by weight of the first block, and
wherein the antioxidant is at least one selected from the group consisting of a phenol-based antioxidant and a thioether-based antioxidant,
wherein the antioxidant is included at 0.01 to 3 parts by weight with respect to 100 parts by weight of the block copolymer, and wherein a viscosity change of the pressure-sensitive adhesive composition prior to crosslinking after being maintained at 60° C. for 30 days is 5% or less.

8. A display device comprising the pressure-sensitive adhesive optical laminate of claim 7.

9. A display device comprising the pressure-sensitive adhesive polarizing plate of claim 1.

* * * * *